United States Patent
Minoli et al.

(10) Patent No.: US 8,365,783 B2
(45) Date of Patent: Feb. 5, 2013

(54) TIRE TREAD COMPRISING BLOCKS WITH STEPPED SIDEWALLS

(75) Inventors: Claudio Minoli, Milan (IT); Fabio Montanaro, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 363 days.

(21) Appl. No.: 12/312,849

(22) PCT Filed: Nov. 30, 2006

(86) PCT No.: PCT/EP2006/011489
§ 371 (c)(1), (2), (4) Date: May 29, 2009

(87) PCT Pub. No.: WO2008/064703
PCT Pub. Date: Jun. 5, 2008

(65) Prior Publication Data
US 2010/0000643 A1    Jan. 7, 2010

(51) Int. Cl.
*B60C 11/13* (2006.01)
(52) U.S. Cl. .......... 152/209.15; 152/209.21; 152/209.24; 152/902
(58) Field of Classification Search ............. 152/209.15, 152/209.21, 209.24, 902
See application file for complete search history.

(56) References Cited

U.S. PATENT DOCUMENTS

| 4,423,760 | A | 1/1984 | Treves et al. |
| 6,601,623 | B1 * | 8/2003 | Katayama ............... 152/209.15 |
| 2004/0238092 | A1 * | 12/2004 | Colombo et al. ........ 152/209.15 |
| 2007/0102085 | A1 * | 5/2007 | Ohashi .................... 152/209.18 |

FOREIGN PATENT DOCUMENTS

| EP | 0393873 | * | 2/1990 |
| EP | 0 393 873 B1 | | 10/1990 |
| JP | 1-223006 | | 9/1989 |
| JP | 03-186406 | * | 8/1991 |
| JP | 07-096716 | * | 4/1995 |
| JP | 07-186630 | | 7/1995 |
| JP | 2001-354011 | | 12/2001 |
| JP | 2003-191716 | | 7/2003 |

* cited by examiner

*Primary Examiner* — Steven D Maki
*Assistant Examiner* — Robert Dye
(74) *Attorney, Agent, or Firm* — Finnegan, Henderson, Farabow, Garrett & Dunner, LLP

(57) ABSTRACT

A tire includes a tread band having a tread pattern defined by a plurality of grooves of substantially circumferential orientation and by a plurality of grooves of substantially transverse orientation, which grooves delimit a plurality of rubber blocks arranged in a plurality of rows of substantially circumferential orientation, each of the blocks being delimited by a contact face and at least three side faces, wherein at least some of the blocks include at least one side face of substantially transverse orientation provided with at least one irregularly shaped step having an upper face and a front face.

36 Claims, 7 Drawing Sheets

TIRE TREAD COMPRISING BLOCKS WITH STEPPED SIDEWALLS

CROSS REFERENCE TO RELATED APPLICATION

This application is a national phase application based on PCT/EP2006/011489, filed Nov. 30, 2006, the content of which is incorporated herein by reference.

FIELD OF THE INVENTION

This invention concerns tire treads, especially, but not exclusively, tire treads for pneumatic tires used for heavy load automotive transport e.g. vehicles such as lorries, buses, coaches and the like. Such tires, often known generally as "truck tires", have tread patterns which are required for all-weather type tires for travelling very long distances.

BACKGROUND OF THE ART

It is known to provide the treads of the tires with tread patterns formed of a plurality of blocks delimited by grooves of generally transverse and circumferential (or longitudinal) orientation. Each block of the tread pattern has a so-called leading face and a trailing face, each of which faces intersects the contact face of the block to form an edge (leading edge and trailing edge, respectively). The leading edge corresponds to a line of points of the contact face coming first as the tire contacts the road.

Trailing edges of blocks in the patterns tend to wear to a greater extent than leading edges which are brought into contact with a road surface earlier than the trailing edges, to thus produce uneven wear of the blocks in the patterns. Such a peculiar wear is referred to as "heel-and-tow wear".

Another problem commonly encountered by all types of tire treads is that of stone trapping. If a stone or a piece of gravel or a like object is of similar or slightly larger size to a groove between blocks in the tire tread, it is very likely that stones or like objects lodge in the groove. As the tire rotates the stone or the like object rubs against the groove boundary and can cause damage. The likelihood of damage is even greater when the stone or like object contacts the groove base since a tear can start from this location. If a stone does lodge in a groove and can be prevented from contacting the groove base the possibility of a tear being caused is substantially reduced.

EP 393,873 discloses a vehicle tyre having a tread surface of ribs, blocks or pads and substantially U- or V-shaped tread grooves arranged therebetween wherein at least one of the two sidewalls of at least a part of the tread grooves is provided with grip enhancing steps which extend in the longitudinal groove direction and follow the sidewall contour. A pronounced improvement is achieved in traction, in particular on snow.

U.S. Pat. No. 4,423,760 discloses a tire tread for a truck tire comprising a small number of circumferential zig-zag grooves, wherein the sidewalls of each groove are each provided with a supporting buttress of varying height or width such that the maximum support is provided at or adjacent the points where the groove projects into the surrounding tread rubber. The provision of such a buttress provides a varying degree of support for each groove sidewall along the length of the groove and assists in preventing uneven wear of the tread rubber and reduces damage caused by stones trapped in the groove.

SUMMARY OF THE INVENTION

The tire according to the invention comprises a tread having a tread pattern defined by a plurality of grooves of generally circumferential orientation and by a plurality of grooves of generally transverse orientation, which grooves delimit a plurality of rubber blocks arranged in a plurality of rows, preferably at least three, having generally circumferential orientation. The outermost rows define the edges of the tread and preferably enclose at least one intermediate row of blocks. Each block is delimited by a ground contact face and at least three side faces, at least one side face having a generally transverse orientation. The number of side faces can preferably range from four to eight.

According to a preferred embodiment, each block comprises a ground contact face and at least four side faces comprising at least two transverse faces, represented by at least one leading face and at least one trailing face, and at least two longitudinal faces, represented by at least one right face and at least one left face.

According to another preferred embodiment, each block comprises a contact face and at least six side faces comprising at least four transverse faces, represented by at least two leading faces and at least two trailing faces, and at least two longitudinal faces, represented by at least one right face and at least one left face.

The contact face corresponds to the part of the block in contact with the ground under normal pressure and load use conditions. This contact face is delimited by leading and trailing contact edges, the leading contact edge being the location of the points of the contact face which are the first to come into contact with the ground and the trailing contact edge being the location of the points of the contact face which are the last to be in contact with the ground. The leading face and the trailing face of each block intersect the contact face along the leading contact edge and the trailing contact edge, respectively.

According to the invention, at least some blocks of the tread comprise at least one transverse face, preferably at least one leading transverse face, provided with at least one irregularly shaped step having an upper face and a front face. Preferably, the number of blocks provided with at least one irregularly shaped step according to the invention is at least 20%, more preferably at least 40%, and still more preferably at least 60% relative to the total number of the tread blocks. Most preferably, the number of blocks provided with at least one irregularly shaped step according to the invention ranges from 80% to 100% relative to the total number of the tread blocks.

The wording "irregularly shaped step" means that at least one of said upper and front face of such step lies on a plane forming an angle higher than 5° with respect to the plane of the block contact face or the plane of the block side face of substantially transverse orientation provided with such step, respectively.

In other words, an irregularly shaped step according to the invention shall have at least an upper face lying on a plane forming an angle higher than 5° with the plane of the contact face of the block, and/or at least a front face lying on a plane forming an angle higher than 5° with the plane of the transverse face provided with such step of the block.

More in particular, each irregularly shaped step provided to the block can have an upper face which can lie on a plane substantially parallel to, or forming an angle higher than 5°, with respect to the transverse direction, and/or to the longitudinal (or circumferential) direction, with the plane of the contact face of the block under consideration.

Preferably, the upper face of each step lies on a plane which can form with the plane of the contact face of the block under consideration an angle of from 5° to 60°, preferably from 5° to 45°, and most preferably from 5° to 30° with respect to the transverse direction, or an angle of from 5° to 45°, preferably from 5° to 30° with respect to the longitudinal direction, or both.

More in particular, each irregularly shaped step provided to the block can have a front face which can lie on a plane substantially parallel to, or forming an angle higher than 5° with respect to the transverse direction and/or to the radial direction with the plane of the leading face of the block under consideration.

Preferably, the front face of each step lies on a plane which can form with the plane of the contact face of the block under consideration an angle of from 5° to 30°, more preferably from 5° to 20°, either with respect to the transverse direction or to the radial direction or both.

For sake of clarity, when, in the whole present description and the claims thereof, an angle or an angle range is expressed as an absolute value, i.e., without the "plus" or "minus" sign, this means that the expressed angle or angle range includes both the positive and negative values. For example, the above expression "higher than 5°" means both "higher than +5°" and "lower than −5°". On the other hand, the above expression "from 5° to 30°" means both "from −5° to −30°" and "from +5° to +30°".

On the other hand, when, in the whole present description and the claims thereof, an angle or an angle range is expressed with the "plus" or "minus" sign, this means that such an angle or angle range is obtained by rotating one plane (or face) in the clockwise direction with respect to the other plane (or face) in case of "plus" sign, and in the counter-clockwise direction in case of "minus" sign.

Further, when, in the whole present description and the claims thereof, the term "substantially parallel" is used with respect to two planes (or two faces), this means that such planes (or such faces) form an angle ranging from −5° to +5° each other.

The upper face of each irregularly shaped step can have a variable width that can change in the transverse direction of the block from the intersection with one longitudinal face to the intersection with the other longitudinal face of the block. The step width (Ws) depends on the width of the groove between two faced blocks (Wg). The maximum Ws is lower than Wg. Preferably, the step width can range from 0% to 60%, preferably from 10% to 40%, relative to the width of the groove between two faced blocks.

The front face of each irregularly shaped step can have a variable height that can change in the transverse direction of the block from the intersection with one longitudinal face to the intersection with the other longitudinal face of the block. The step height (Hs) depends on the height of the block (Hb). The maximum Hs is lower than Hb. Preferably, the step height can range from 5% to 80%, preferably from 10% to 60% relative to the height of the block.

The intersection of each upper face with the corresponding each front face of each irregularly shaped step can be represented by a sharp edge or a round edge. The round edge can be formed by any radius able to join the upper face with the corresponding front face. The radius can also in turn be constant or variable along the transverse direction of the edge.

The Applicant has found that the tire according to the invention shows a reduced "heel-and-tow wear" compared to a tire of the prior art and allows continuous travelling for a long period of time.

The Applicant has also found that the tire according to the invention is less prone to entrap stones or gravels. Additionally, in case a stone or gravel was entrapped, it is prevented from contacting the groove base, it is easily throw out during the rotation of the tire, and the possibility of a tear being caused is substantially reduced.

DETAILED DESCRIPTION OF THE INVENTION

In the FIGS. 1 to 7, the x, y, and z lines represent the longitudinal, radial and transverse direction of a tyre tread, respectively. The arrow on the x line indicates the tyre rolling direction. The length l, the width w and the height h of the blocks represented in FIGS. 1 to 7 can have any value known in the art of tyre manufacturing. Preferably, the blocks have a length l in the range of from 10 to 100 mm, a width w in the range of from 10 to 100 mm, and a height h in the range of from 10 to 100 mm.

Figure 1:
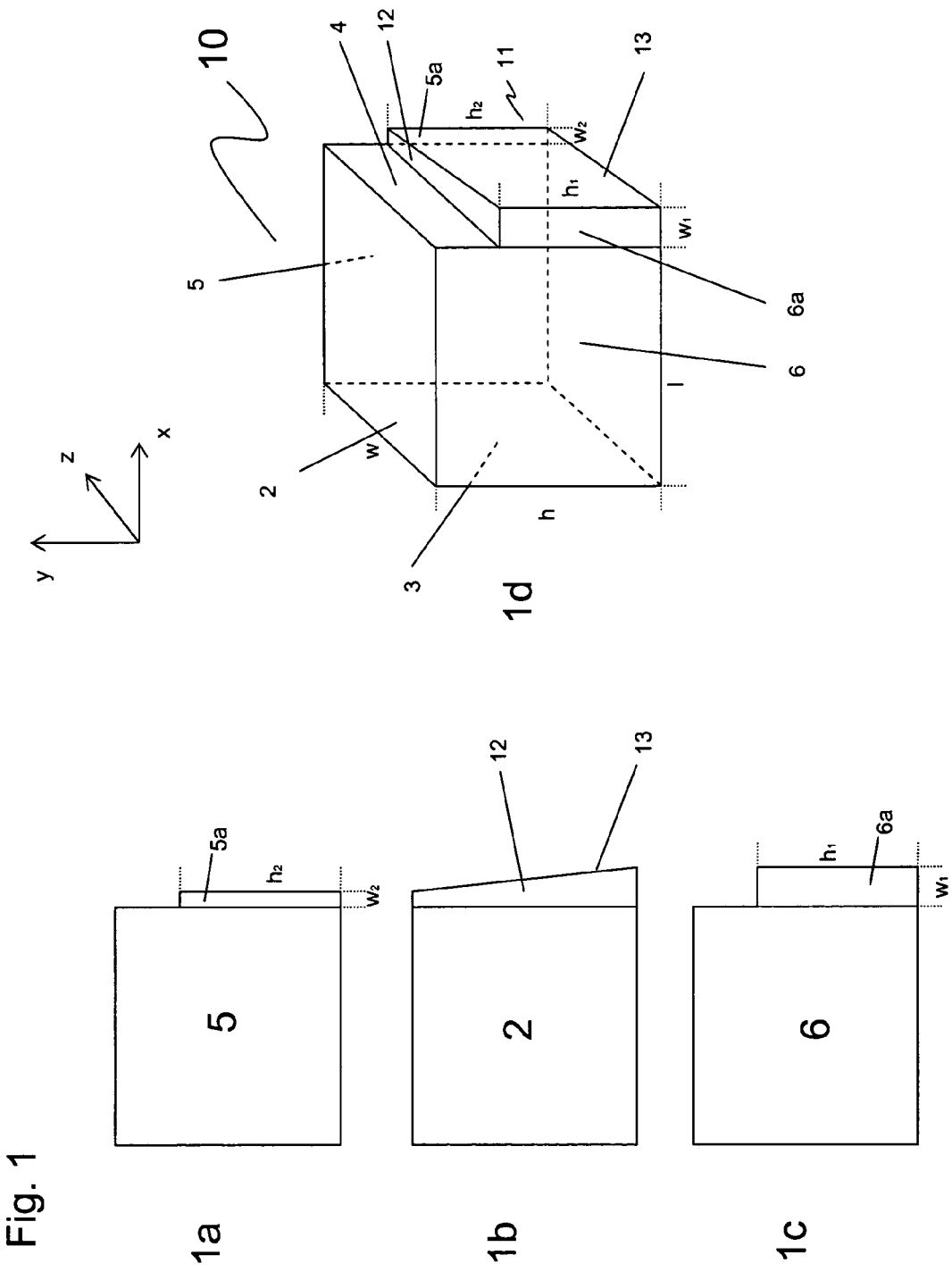
FIG. 1 shows the plan (b), side (a,c), and perspective (d) views of a block according to a first embodiment of the present invention.

FIG. 1 shows a block 10 according to a first embodiment of the present invention, comprising a contact face 2, two transverse faces 3 and 4, represented by one trailing face 3 and one leading face 4, and two longitudinal faces 5 and 6, represented by one right face 5 and one left face 6.

Typically, the block 10 can represent an embodiment of one block of a plurality of blocks forming an outermost row situated on the edges of the tread and forming the shoulders of the tire.

The block 10 is characterized by the presence of a step 11 formed on the leading face 4. The step 11 is delimited by an upper face 12, a front face 13, and two longitudinal faces 5a and 6a prosecuting the longitudinal faces 5 and 6 of the block 10.

In the embodiment of FIG. 1, the upper face 12 is substantially parallel to the contact face 2, both with respect to the transverse direction z, and to the longitudinal direction x.

In the embodiment of FIG. 1, the front face 13 is substantially parallel with the leading face 4 with respect to the radial direction y, but it forms an angle of from 5° to 30° with respect to the transverse direction z.

The heights $h_1$ and $h_2$ of the step 11 are equal and can range from 5% to 80%, preferably from 10% to 60%, relative to the height h of the block 10.

The widths $w_1$ and $w_2$ of the step 11 are different and can independently range from 0% to 60%, preferably from 10% to 40%, relative to the maximum width between two faced blocks. While in the embodiment of FIG. 1 width $w_1$ is greater than width $w_2$, in a different embodiment width $w_1$ can also be lower than width $w_2$.

Figure 2:
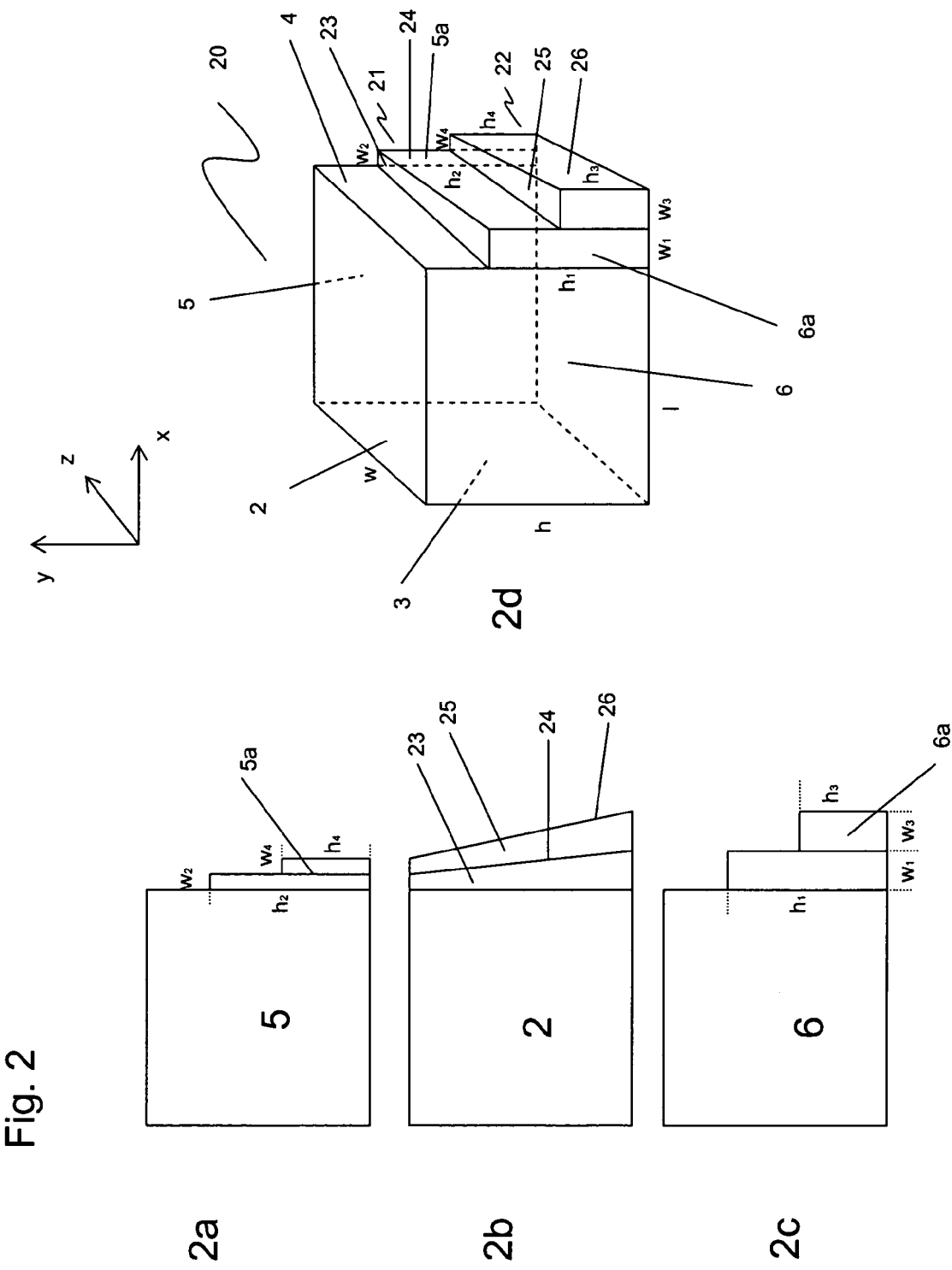
FIG. 2 shows the plan (b), side (a,c), and perspective (d) views of a block according to a second embodiment of the present invention.

FIG. 2 shows a block 20 according to a second embodiment of the present invention, comprising a contact face 2, two transverse faces 3 and 4, represented by one trailing face 3 and one leading face 4, and two longitudinal faces 5 and 6, represented by one right face 5 and one left face 6.

Typically, the block 20 can represent an embodiment of one block of a plurality of blocks forming an outermost row situated on the edges of the tread and forming the shoulders of the tire.

The block 20 is characterized by the presence of two steps 21 and 22 formed on the leading face 4. The step 21 is delimited by an upper face 23, a front face 24, and a first portion of the two longitudinal faces 5a and 6a prosecuting the longitudinal faces 5 and 6 of the block 20. The step 22 is delimited by an upper face 25, a front face 26, and a second portion of the two longitudinal faces 5a and 6a prosecuting the longitudinal faces 5 and 6 of the block 20.

In the embodiment of FIG. 2, the upper faces 23 and 25 are substantially parallel to the contact face 2 both with respect to the transverse direction z, and to the longitudinal direction x.

In the embodiment of FIG. 2, the front faces 24 and 26 are substantially parallel with the leading face 4 with respect to the radial direction y, but they form, each independently, an angle of from 5° to 30° with respect to the transverse direction z.

In the embodiment of FIG. 2, the heights $h_1$ and $h_2$ of the step 21 are equal and can range from 5% to 80%, preferably from 10% to 60%, relative to the height h of the block 20. Similarly, the heights $h_3$ and $h_4$ of the step 22 are equal and can range from 5% to 80%, preferably from 10% to 60%, relative to the height h of the block 20.

The widths $w_1$ and $w_2$ of the step 21 are different and can independently range from 0% to 60%, preferably from 10% to 40%, relative to the maximum width between two faced blocks. Similarly, the widths $w_3$ and $w_4$ of the step 22 are different and can independently range from 0% to 60%, preferably from 10% to 40%, relative to the maximum width between two faced blocks.

Additionally, while in the embodiment of FIG. 2 the widths $w_1$ and $w_3$ as well as $w_2$ and $w_4$ are represented with the same value, they can also be different each other and independently range from 0% to 60%, preferably from 10% to 40%, relative to the maximum width between two faced blocks.

Figure 3:
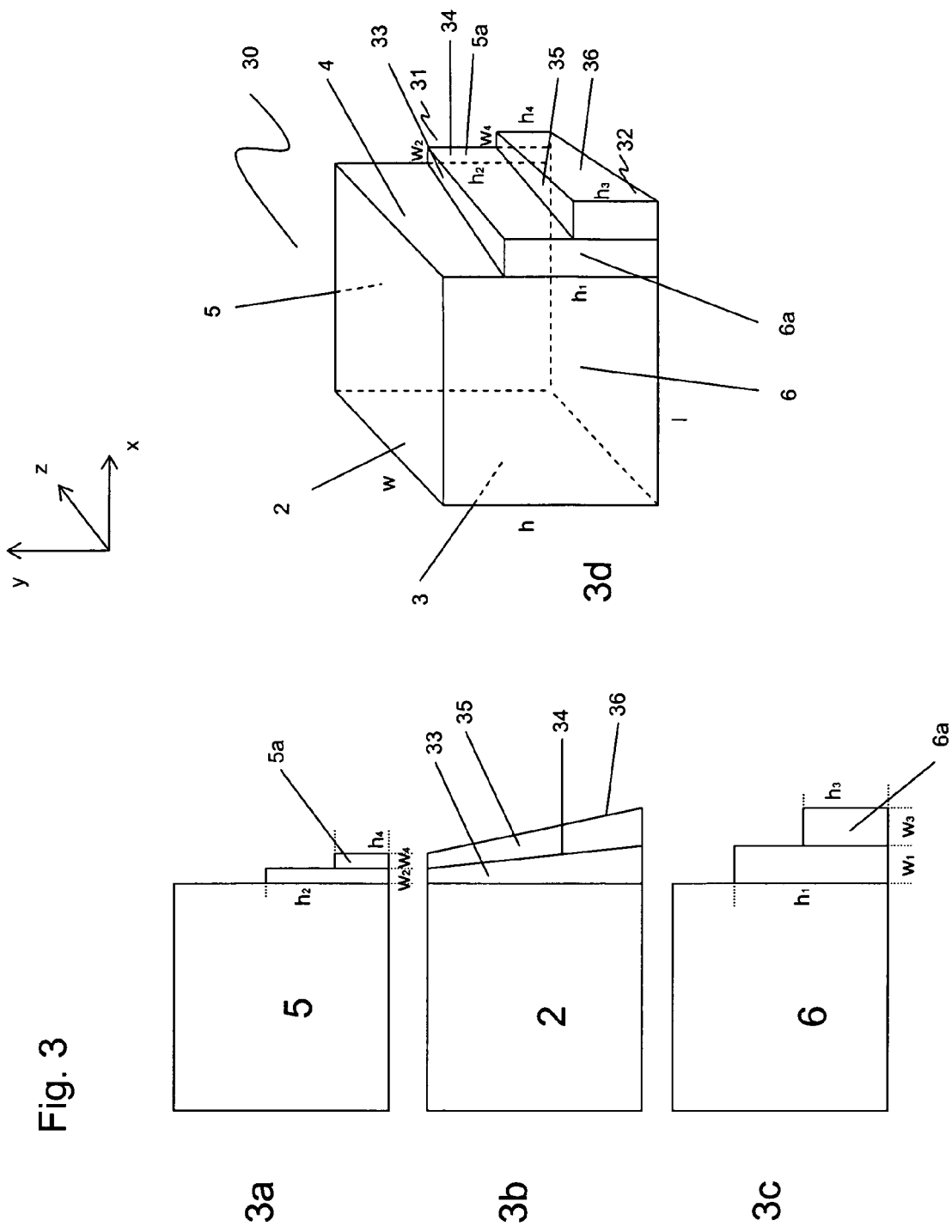
FIG. 3 shows the plan (b), side (a,c), and perspective (d) views of a block according to a third embodiment of the present invention.

FIG. 3 shows a block 30 according to a third embodiment of the present invention, comprising a contact face 2, two transverse faces 3 and 4, represented by one trailing face 3 and one leading face 4, and two longitudinal faces 5 and 6, represented by one right face 5 and one left face 6.

Typically, the block 30 can represent an embodiment of one block of a plurality of blocks forming an outermost row situated on the edges of the tread and forming the shoulders of the tire.

Similarly to the block 20 of FIG. 2, the block 30 of FIG. 3 is characterized by the presence of two steps 31 and 32 formed on the leading face 4. The step 31 is delimited by an upper face 33, a front face 34, and a first portion of the two longitudinal faces 5a and 6a prosecuting the longitudinal faces 5 and 6 of the block 30. The step 32 is delimited by an upper face 35, a front face 36, and a second portion of the two longitudinal faces 5a and 6a prosecuting the longitudinal faces 5 and 6 of the block 30.

In the embodiment of FIG. 3, the upper faces 33 and 35 are substantially parallel to the contact face 2 with respect to the longitudinal direction x, but they form, each independently, an angle of from 5° to 60°, preferably from 5° to 45°, with respect to the transverse direction z.

In the embodiment of FIG. 3, the front faces 34 and 36 are substantially parallel with the leading face 4 with respect to the radial direction y, but they form, each independently, an angle of from 5° to 30°, preferably from 5° to 20°, with respect to the transverse direction z.

In the embodiment of FIG. 3, the heights $h_1$ and $h_2$ of the step 31 are different and can independently range from 5% to 80%, preferably from 10% to 60%, relative to the height h of the block 30. Similarly, the heights $h_3$ and $h_4$ of the step 32 are different and can independently range from 5% to 80%, preferably from 10% to 60%, relative to the height h of the block 30.

The widths $w_1$ and $w_2$ of the step 31 are different and can independently range from 0% to 60%, preferably from 10% to 40%, relative to the maximum width between two faced blocks. Similarly, the widths $w_3$ and $w_4$ of the step 32 are different and can independently range from 0% to 60%, preferably from 10% to 40%, relative to the maximum width between two faced blocks.

Additionally, while in the embodiment of FIG. 3 the widths $w_1$ and $w_3$ as well as $w_2$ and $w_4$ are represented with the same value, they can also be different each other and independently range from 0% to 60%, preferably from 10% to 40%, relative to the maximum width between two faced blocks.

Figure 4:
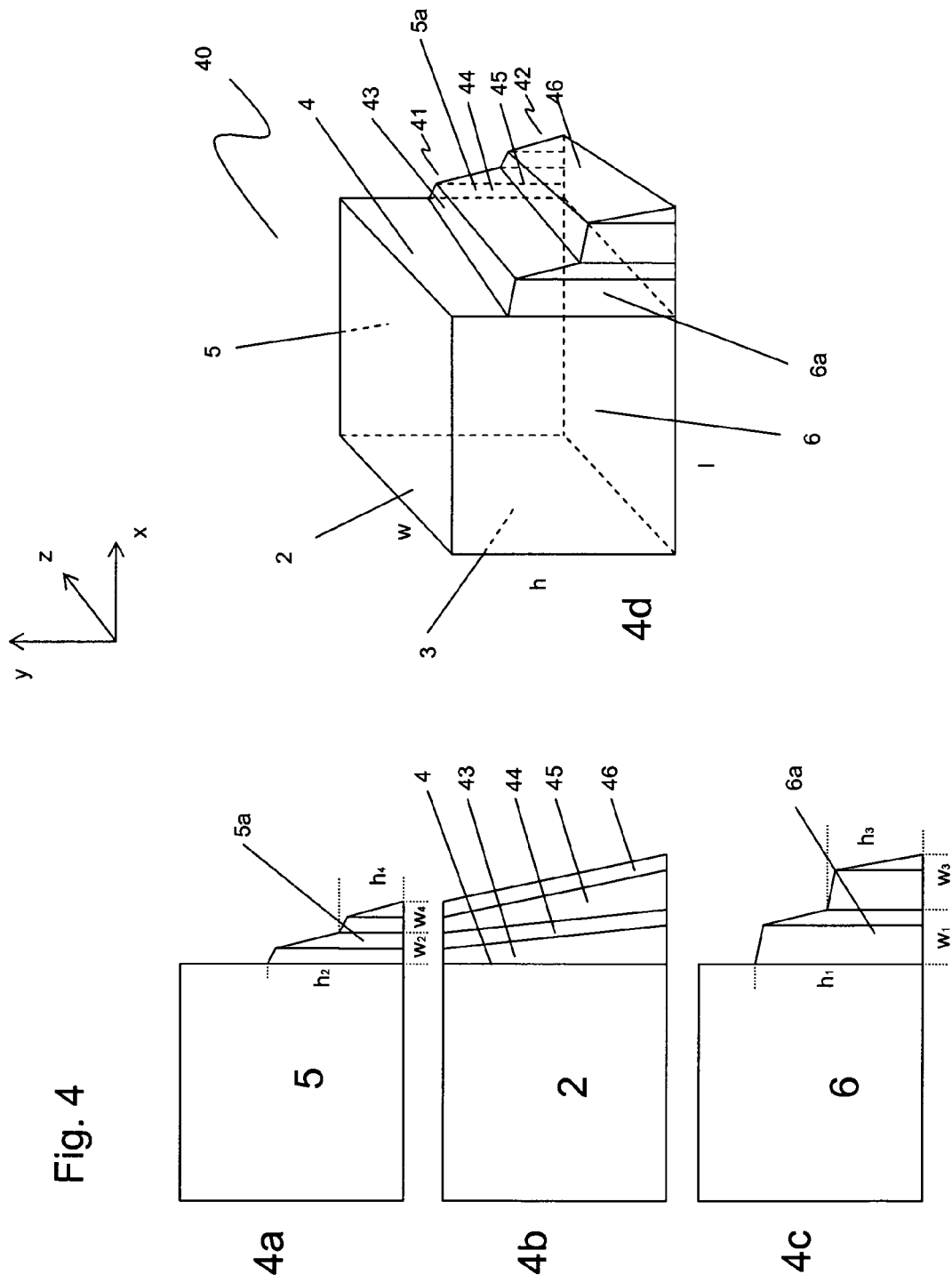
FIG. 4 shows the plan (b), side (a,c), and perspective (d) views of a block according to a fourth embodiment of the present invention.

FIG. 4 shows a block 40 according to a fourth embodiment of the present invention, comprising a contact face 2, two transverse faces 3 and 4, represented by one trailing face 3 and one leading face 4, and two longitudinal faces 5 and 6, represented by one right face 5 and one left face 6.

Typically, the block 40 can represent an embodiment of one block of a plurality of blocks forming an outermost row situated on the edges of the tread and forming the shoulders of the tire.

Similarly to the block 20 of FIG. 2, the block 40 of FIG. 4 is characterized by the presence of two steps 41 and 42 formed on the leading face 4. The step 41 is delimited by an upper face 43, a front face 44, and a first portion of the two longitudinal faces 5a and 6a prosecuting the longitudinal faces 5 and 6 of the block 40. The step 42 is delimited by an upper face 45, a front face 46, and a second portion of the two longitudinal faces 5a and 6a prosecuting the longitudinal faces 5 and 6 of the block 40.

In the embodiment of FIG. 4, the upper faces 43 and 45 lie on planes forming with the plane of the contact face 2, each independently, an angle of from 5° to 45°, preferably from 5° to 30°, with respect to the longitudinal direction x, and an angle of from 5° to 60°, preferably from 5° to 45°, with respect to the transverse direction z.

In the embodiment of FIG. 4, the front faces 44 and 46 lie on planes forming with the plane of the leading face 4, each independently, an angle of from 5° to 30°, preferably from 5° to 20°, both with respect to the transverse direction z and to the radial direction y.

In the embodiment of FIG. 4, the heights $h_1$ and $h_2$ of the step 41 are different and can independently range from 5% to 80%, preferably from 10% to 60%, relative to the height h of the block 40. Similarly, the heights $h_3$ and $h_4$ of the step 42 are different and can independently range from 5% to 80%, preferably from 10% to 60%, relative to the height h of the block 40.

The widths $w_1$ and $w_2$ of the step 41 are different and can independently range from 0% to 60%, preferably from 10% to 40%, relative to the maximum width between two faced blocks. Similarly, the widths $w_3$ and $w_4$ of the step 42 are different and can independently range from 0% to 60%, preferably from 10% to 40%, relative to the maximum width between two faced blocks.

Additionally, while in the embodiment of FIG. 4 the widths $w_1$ and $w_3$ as well as $w_2$ and $w_4$ are represented with the same value, they can also be different each other and independently range from 0% to 60%, preferably from 10% to 40%, relative to the maximum width between two faced blocks.

Figure 5:
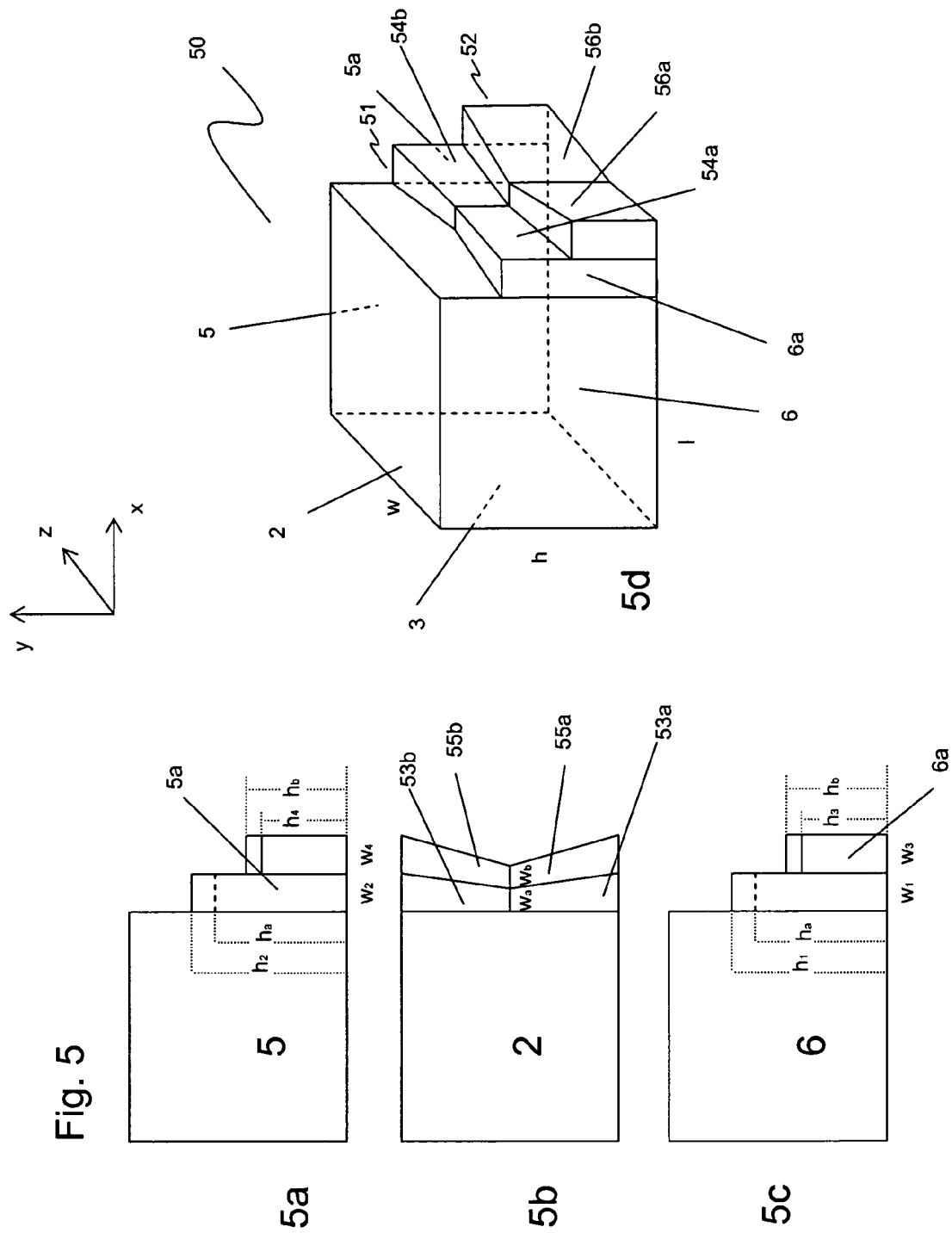
FIG. 5 shows the plan (b), side (a,c), and perspective (d) views of a block according to a fifth embodiment of the present invention.

FIG. 5 shows a block 50 according to a fifth embodiment of the present invention, comprising a contact face 2, two transverse faces 3 and 4, represented by one trailing face 3 and one leading face 4, and two longitudinal faces 5 and 6, represented by one right face 5 and one left face 6.

Typically, the block 50 can represent an embodiment of one block of a plurality of blocks forming an intermediate row situated between the outermost rows forming the shoulders of the tire.

Similarly to the block 20 of FIG. 2, the block 50 of FIG. 5 is characterized by the presence of two steps 51 and 52 formed on the leading face 4. The step 51 is delimited by an upper face 53, a front face 54, and a first portion of the two longitudinal faces 5a and 6a prosecuting the longitudinal faces 5 and 6 of the block 50. The step 52 is delimited by an upper face 55, a front face 56, and a second portion of the two longitudinal faces 5a and 6a prosecuting the longitudinal faces 5 and 6 of the block 50.

The upper face 53 is formed by two half-faces 53a and 53b having different orientation each other.

More in particular, the half-face 53a lies on a plane forming with the plane of the contact face 2 an angle of from +5° to +60° with respect to the transverse direction z (while being substantially parallel with respect to the longitudinal direction x). The half-face 53b lies on a plane forming with the plane of the contact face 2 an angle of from −5° to −60° with respect to the transverse direction z (while being substantially parallel with respect to the longitudinal direction x).

Similarly, the upper face 55 is formed by two half-faces 55a and 55b having different orientation each other.

More in particular, the half-face 55a lies on a plane forming with the plane of the contact face 2 an angle of from −5° to −60° with respect to the transverse direction z (while being substantially parallel with respect to the longitudinal direction x). The half-face 55b lies on a plane forming with the plane of the contact face 2 an angle of from +5° to +60° with respect to the transverse direction z (while being substantially parallel with respect to the longitudinal direction x).

The front face 54 is formed by two half-faces 54a and 54b having different orientation each other. Similarly, the front face 56 is formed by two half-faces 56a and 56b having different orientation each other.

In the embodiment of FIG. 5, the second half-faces 54a and 56a lie on planes forming with the plane of the leading face 4, each independently, an angle of from +5° to +30° with respect to the transverse direction z (while being substantial parallel with respect to the radial direction y). The second half-faces 54b and 56b lie on planes forming with the plane of the leading face 4, each independently, an angle of from −5° to −30° with respect to the transverse direction z (while being substantial parallel with respect to the radial direction y).

In the embodiment of FIG. 5, two half-faces have been provided for each of the upper faces 53 and 55 and the front faces 54 and 56. However, it must be understood that any upper and/or front face of any irregularly shaped step according to the invention can be formed by a plurality of sub-faces having different orientation each other. Preferably, the number of sub-faces ranges from 1 to 6, more preferably from 1 to 4, and most preferably from 1 to 3.

In the embodiment of FIG. 5, the heights $h_1$ (or $h_2$) and $h_a$ of the step 51 are different and can independently range from 5% to 80%, preferably from 10% to 60%, relative to the height h of the block 50. Similarly, the heights $h_3$ (or $h_4$) and $h_b$ of the step 52 are different and can independently range from 5% to 80%, preferably from 10% to 60%, relative to the height h of the block 50.

The widths $w_1$ (or $w_2$) and $w_a$ of the step 51 are different and can independently range from 0% to 60%, preferably from 10% to 40%, relative to the maximum width between two faced blocks. Similarly, the widths $w_3$ (or $w_4$) and $w_b$ of the step 52 are different and can independently range from 0% to 60%, preferably from 10% to 40%, relative to the maximum width between two faced blocks.

In the embodiment of FIG. 5, the heights $h_1$ and $h_2$ as well as $h_3$ and $h_4$ are represented with the same value. However, they can also be different each other and independently range from 5% to 80%, preferably from 10% to 60%, relative to the height h of the block 50.

Additionally, while in the embodiment of FIG. 5 the widths $w_1$, $w_2$, $w_3$ and $w_4$ are represented with the same value, they can also be different each other and independently range from 0% to 60%, preferably from 10% to 40%, relative to the maximum width between two faced blocks.

For sake of simplicity, in the above described examples the number of steps has been limited to two. However, the number of steps for each block is not particularly limited and any number can be contemplated. In practice, it is preferable to have a number of steps from 1 to 8, more preferably from a 1 to 5, and most preferably from 1 to 3.

Also, the steps can be formed only on the leading transverse face, as represented in the above examples, but can also be formed only on the trailing transverse face, or on both transverse faces. In case of a plurality of transverse faces, the steps can be formed on any number of transverse faces. However, the presence of at least one step according to the invention on at least one leading transverse face is preferred.

For sake of simplicity, the basic shapes of blocks 10 to 50 of FIG. 1 to 5 are represented as regular cubes. It is understood that the blocks provided with at least one irregular step according to the invention are not limited to the cubic shape, but can have any useful shape known in the art of tread for tyres provided that they have at least one side face of substantially transverse orientation z, preferably at least one transverse leading face, provided with at least one irregularly shaped step having an upper face and a front face.

Also for sake of simplicity, any face of the blocks and irregular steps of FIG. 1 to 5 has been represented as a planar surface. It is understood that the faces of the blocks and irregular steps provided in the tire according to the invention are not limited to a planar surface, but can have any useful shape known in the art of tread for tyres. In case of a non planar surface, the reference plane to be considered for the scope of the present invention shall be the plane passing trough the edges of the face under consideration.

The tread according to the present invention is realized on a tyre having any kind of conventional structure such as, for example, those comprising a carcass, a tread band located on the crown of said carcass, a pair of axially superimposed sidewalls terminating in beads reinforced with bead wires and corresponding bead fillers, for securing said tyre to a corresponding mounting rim. The tyre preferably also comprises a belt structure interposed between the carcass and the tread band. The carcass is usually formed by one or more carcass plies associated to said bead wires, while the belt structure generally comprises at least two belt layers, usually comprising metal cords, parallel to each other in each layer and crossing over those of the adjacent layers, preferably inclined symmetrically with respect to the equatorial plane, and radially superimposed on each other. Optionally, the structure may also comprise additional belt layers, formed by cords, usually metal cords, oriented circumferentially, i.e. with a disposition at substantially zero degrees with respect to said equatorial plane.

Figure 6:
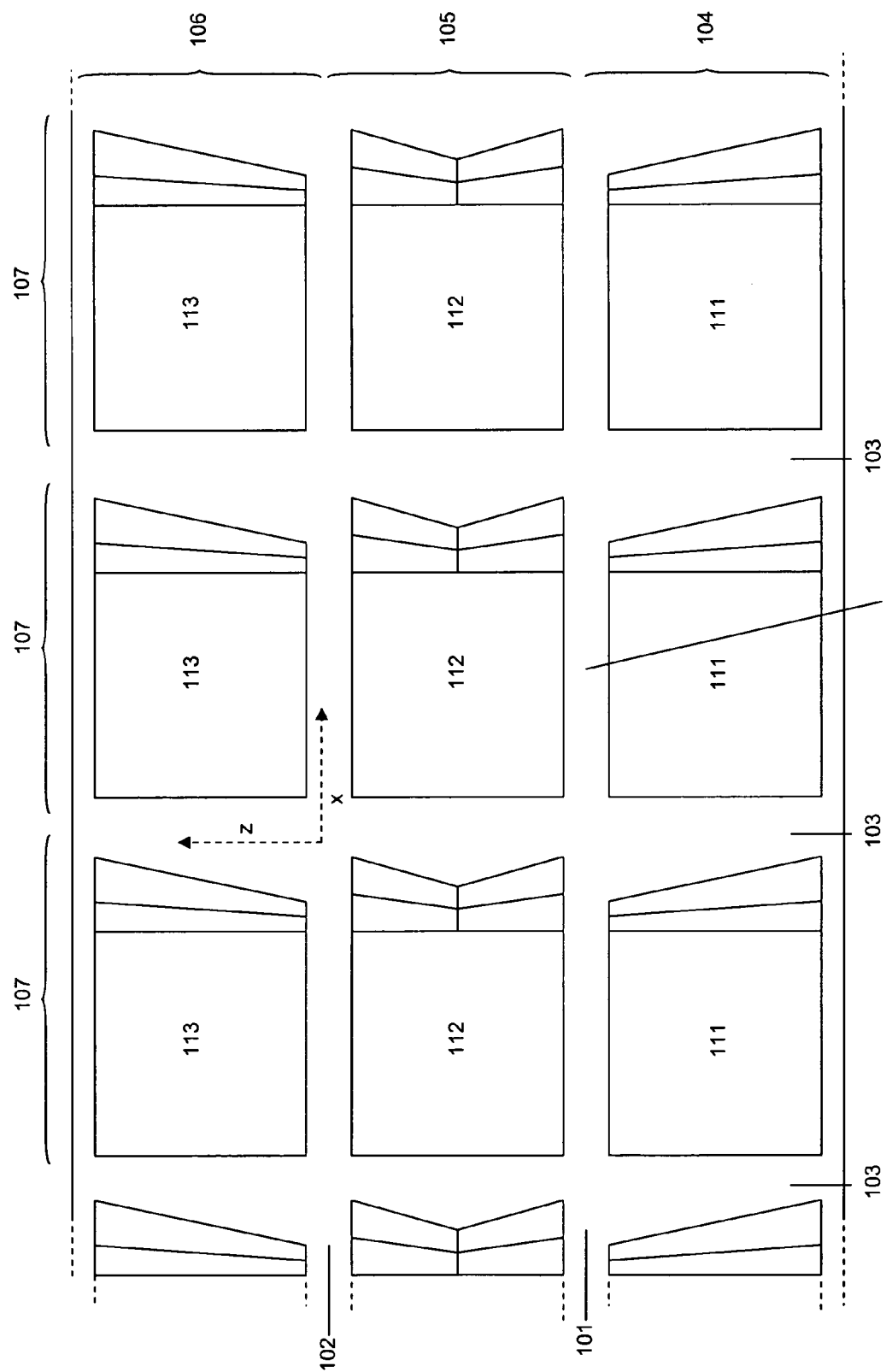
FIG. 6 shows the plan view of a tire comprising a plurality of blocks according to an embodiment of the present invention.

FIG. 6 is a partial plan view of a tread according to an embodiment of the present invention. As illustrated in FIG. 6, the above described tyre has a tread of elastomeric material, provided with two circumferential grooves 101 and 102 and a plurality of transverse grooves 103. Circumferential grooves 101 and 102 divide a tread central region 105 from two shoulder regions 104 and 106, located on the left (104) and on the right (106) of the equatorial plane, respectively. The plurality of transverse grooves 103 divides the tread in a plurality of modules 107, each module comprising a central block 112 belonging to tread central region 105 and two shoulder blocks belonging to tread shoulder regions 104 and 106, namely an external shoulder block 111 and an internal shoulder block 113.

Accordingly, the tread central region 105 comprises a plurality of blocks 112 arranged in a central row and divided by transverse grooves 103. The blocks 112 of FIG. 6 are identical to the above described block 50 of FIG. 5. However, blocks 112 can have any other different irregular shape according to the present invention.

On the other hand, the tread shoulder regions 104 and 106 comprise a plurality of blocks 111 and 113 arranged in an external and internal row, respectively, and divided by transverse grooves 103. The external blocks 111 of FIG. 6 are identical to the above described block 30 of FIG. 3. However, blocks 111 can have any other different irregular shape according to the present invention, such as, for example, those illustrated in FIGS. 1, 2, and 4. The internal blocks 113 of FIG. 6 are specular to blocks 111 and are specularly identical to the above described block 30 of FIG. 3. However, blocks 113 can have any other different irregular shape according to the present invention, such as, for example, those illustrated in FIGS. 1, 2, and 4.

Figure 7:
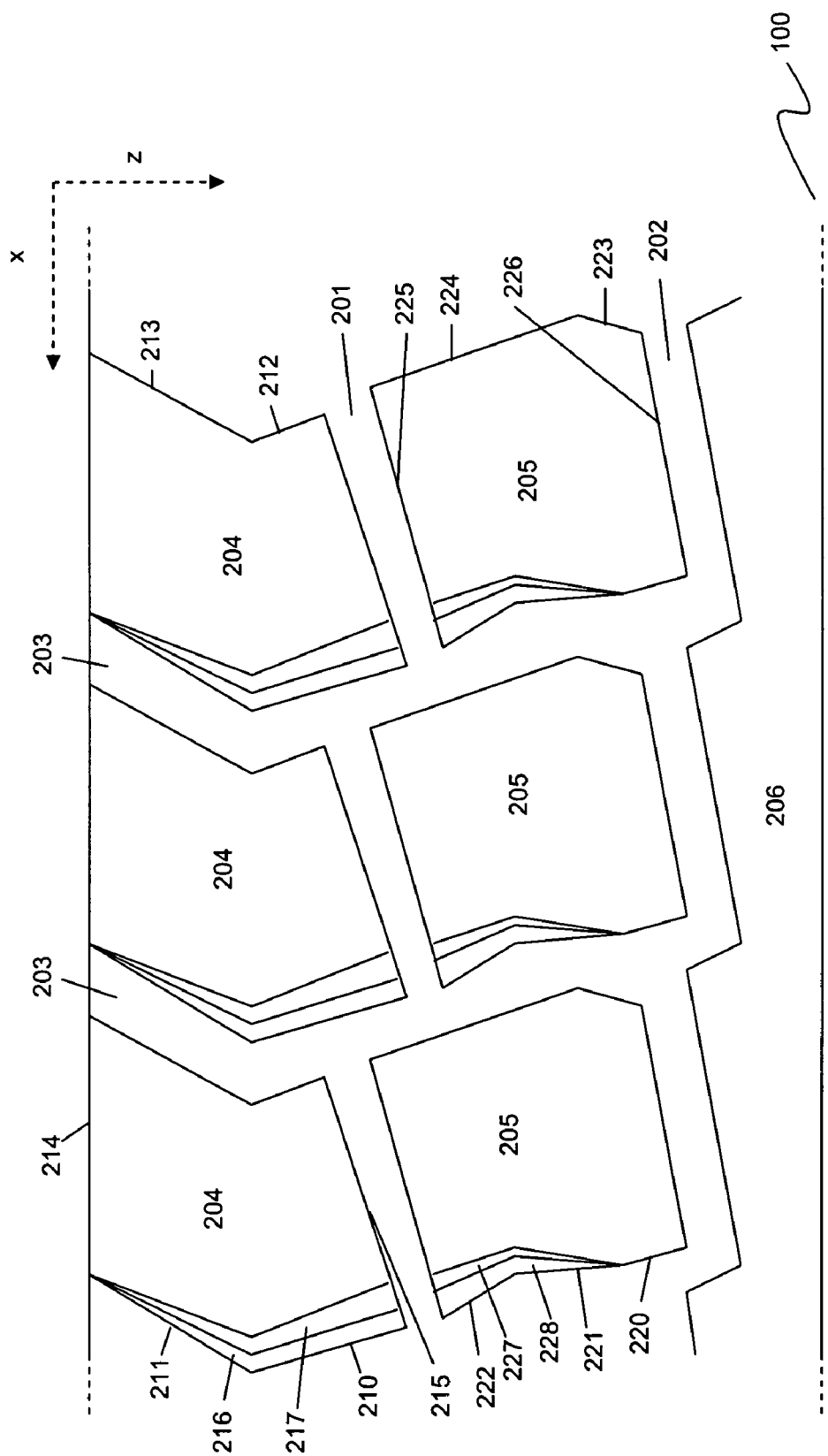
FIG. 7 shows the plan view of a tire comprising a plurality of blocks according to another embodiment of the present invention.

FIG. 7 is a partial plan view of a tread according to another embodiment of the present invention. For sake of simplicity, only half a surface of the tread is illustrated in FIG. 7, the other half being specular with the illustrated surface respective to the equatorial line 100. As illustrated in FIG. 7, the above described tyre has a tread pattern comprising two zig-zag circumferential grooves 201, and 202 and a plurality of zig-zag transverse grooves 203.

The circumferential groove 201 and 202 and the transverse grooves 203 divide the tread in a shoulder circumferential row of blocks 204, a central circumferential row of blocks 205, and a central circumferential continuous rib 206.

The blocks 204 according to the present invention have all the same shape, and comprise two leading transverse faces 210 and 211, two trailing transverse faces 212 and 213, and two longitudinal faces, namely a shoulder face 214 and a central face 215. The leading transverse faces 210 and 211 of blocks 204 comprise two irregularly shaped steps 216 and 217 having an increased width when proceeding from the shoulder face 214 to the central face 215.

The blocks 205 according to the present invention have all the same shape, and comprise three leading transverse faces 220, 221, and 222, two trailing transverse faces 223 and 224, and two longitudinal faces, namely a shoulder face 225 and a central face 226. Two leading transverse faces 221 and 222 of blocks 205 comprise two irregularly shaped steps 227 and 228 having an increased width when proceeding from the shoulder face 225 to the central face 226.

The invention claimed is:

1. A tire comprising a tread band having a tread pattern defined by a plurality of grooves of substantially circumferential orientation and by a plurality of grooves of substantially transverse orientation, said grooves delimiting a plurality of rubber blocks arranged in a plurality of rows of substantially circumferential orientation, each of said blocks having a contact face and at least three side faces, wherein at least some of said blocks comprise at least one side face of substantially transverse orientation provided with a plurality of irregularly shaped steps, each irregularly shaped step being defined by an upper face, a front face, and a pair of longitudinal faces,
   wherein each upper face of each irregularly shaped step forms a first angle greater than 5° with the plane of the contact face of said block with respect to the transverse direction, and
   wherein each front face of each irregularly shaped step forms a second angle greater than 5° with the plane of said at least one side face of substantially transverse orientation of said block.

2. The tire according to claim 1, wherein said first angle ranges from 5° to 60°.

3. The tire according to claim 1, wherein said first angle ranges from 5° to 45°.

4. The tire according to claim 1, wherein said upper face of said irregularly shaped step forms a third angle greater than 5 with the plane of the contact face of said block with respect to a longitudinal direction.

5. The tire according to claim 4, wherein said third angle ranges from 5° to 45°.

6. The tire according to claim 4, wherein said third angle ranges from 5° to 30°.

7. The tire according to claim 1, wherein said second angle is formed with respect to a transverse direction.

8. The tire according to claim 7, wherein said second angle ranges from 5° to 30°.

9. The tire according to claim 7, wherein said second angle ranges from 5° to 20°.

10. The tire according to claim 1, wherein said second angle is formed with respect to a radial direction.

11. The tire according to claim 10, wherein said second angle ranges from 5° to 30°.

12. The tire according to claim 10, wherein said second angle ranges from 5° to 20°.

13. The tire according to claim 1, wherein said upper face of said irregularly shaped step has a variable width changing along a transverse direction of the block.

14. The tire according to claim 13, wherein said variable width can range from 0 to a value lower than the maximum width of a groove between two faced blocks.

15. The tire according to claim 13, wherein said variable width can range from 0% to 60% relative to a maximum width of a groove between two faced blocks.

16. The tire according to claim 13, wherein said variable width can range from 10% to 40% relative to a maximum width of a groove between two faced blocks.

17. The tire according to claim 1, wherein said front face of said irregularly shaped step has a variable height changing along a transverse direction of the block.

18. The tire according to claim 17, wherein said variable height can range from 0 to a value lower than a height of the block.

19. The tire according to claim 17, wherein said variable height can range from 5% to 80% relative to a height of the block.

20. The tire according to claim 17, wherein said variable height can range from 10% to 60% relative to a height of the block.

21. The tire according to claim 1, wherein said blocks are delimited by a contact face and by a number of side faces ranging from four to eight.

22. The tire according to claim 1, wherein said blocks are delimited by a contact face and at least four side faces, said at least four side faces comprising at least two transverse faces and at least two longitudinal faces.

23. The tire according to claim 22, wherein said at least two transverse faces are represented by at least one leading face and at least one trailing face.

24. The tire according to claim 22, wherein said at least two longitudinal faces are represented by at least one right face and at least one left face.

25. The tire according to claim 1, wherein said blocks are delimited by a contact face and at least six side faces, said at least six side faces comprising at least four transverse faces and at least two longitudinal faces.

26. The tire according to claim 25, wherein said at least four transverse faces are represented by at least two leading faces and at least two trailing faces.

27. The tire according to claim 25, wherein said at least two longitudinal faces are represented by at least one right face and at least one left face.

28. The tire according to claim 1, wherein said blocks comprise at least one side face of generally transverse orientation provided with one to eight irregularly shaped steps, each of said steps having an upper face and a front face.

29. The tire according to claim 1, wherein said blocks comprise at least one side face of generally transverse orientation provided with one to five irregularly shaped steps, each of said steps having an upper face and a front face.

30. The tire according to claim 1, wherein said blocks comprise at least one side face of generally transverse orientation provided with one to three irregularly shaped steps, each of said steps having an upper face and a front face.

31. The tire according to claim 1, wherein said upper face of said irregularly shaped step is formed by a plurality of sub-faces having different orientation with each other.

32. The tire according to claim 1, wherein said front face of said irregularly shaped step is formed by a plurality of sub-faces having different orientation with each other.

33. The tire according to claim 1, wherein a number of said blocks comprising at least one side face of substantially transverse orientation provided with at least one irregularly shaped step is at least 20% relative to a total number of tread blocks.

34. The tire according to claim 1, wherein a number of said blocks comprising at least one side face of substantially transverse orientation provided with at least one irregularly shaped step is at least 40% relative to a total number of tread blocks.

35. The tire according to claim 1, wherein a number of said blocks comprising at least one side face of substantially transverse orientation provided with at least one irregularly shaped step is at least 60% relative to a total number of tread blocks.

36. The tire according to claim 1, wherein a number of said blocks comprising at least one side face of substantially transverse orientation provided with at least one irregularly shaped step ranges from 80% to 100% relative to a total number of tread blocks.

* * * * *